Sept. 8, 1925.
W. A. TURBAYNE
SYSTEM OF ELECTRICAL REGULATION
Original Filed June 29, 1914    3 Sheets-Sheet 2
1,552,970
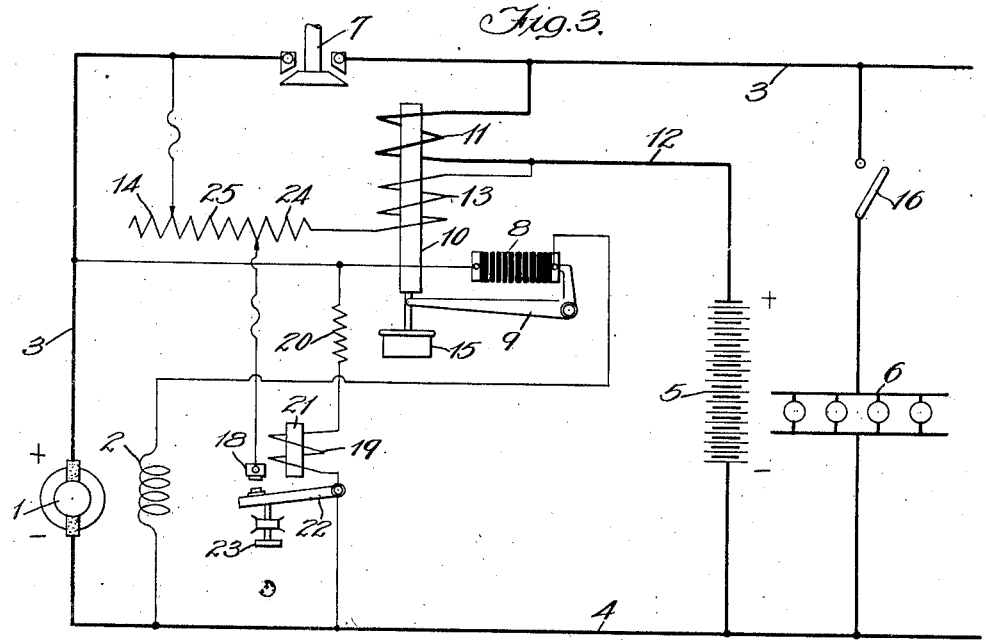
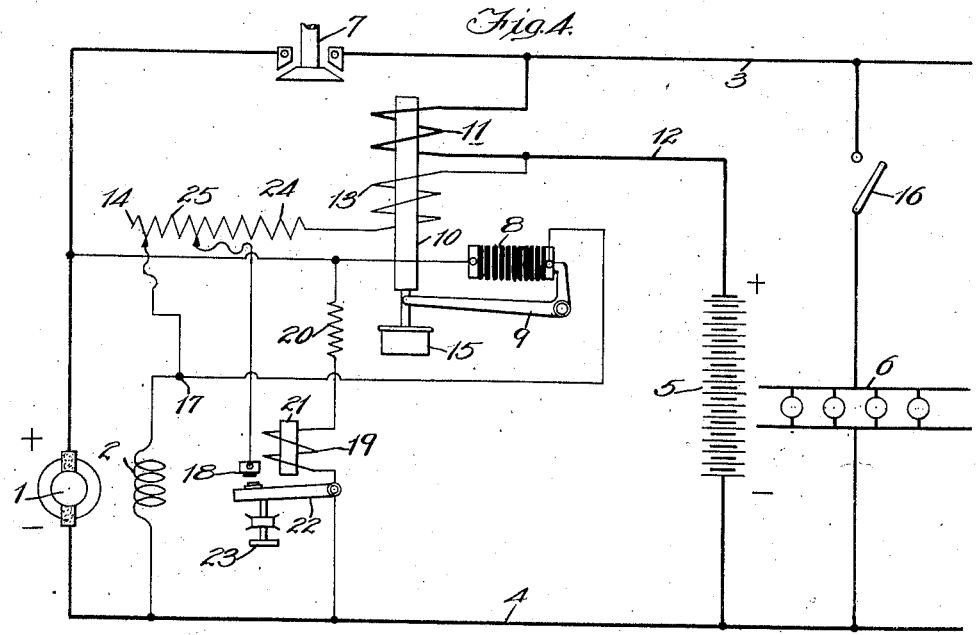

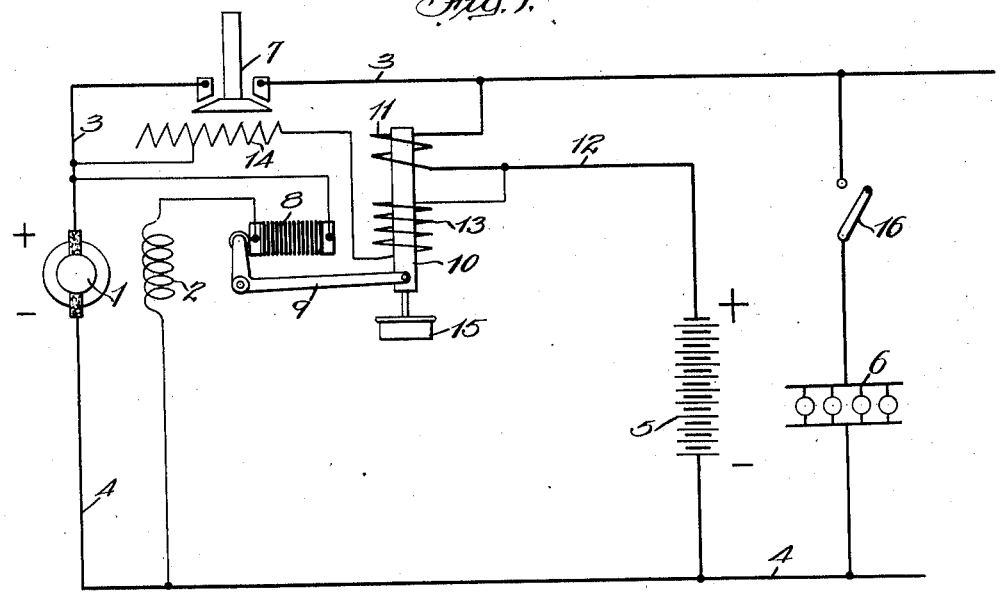
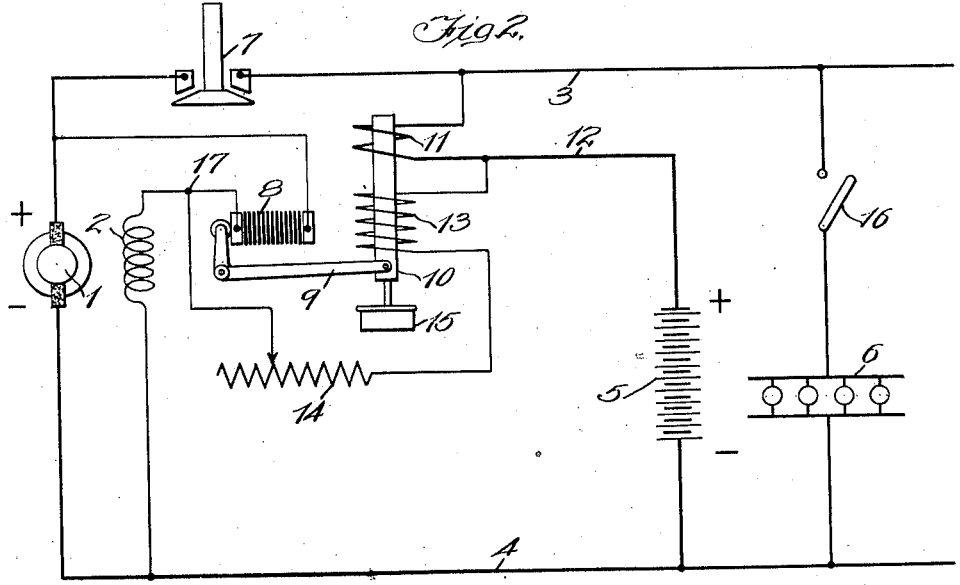

Sept. 8, 1925

W. A. TURBAYNE 1,552,970

SYSTEM OF ELECTRICAL REGULATION

Original Filed June 29, 1914    3 Sheets-Sheet 3

Patented Sept. 8, 1925.

1,552,970

UNITED STATES PATENT OFFICE.

WILLIAM A. TURBAYNE, OF NIAGARA FALLS, NEW YORK, ASSIGNOR, BY MESNE ASSIGNMENTS, TO THE SAFETY CAR HEATING AND LIGHTING COMPANY, OF NEW YORK, N. Y., A CORPORATION OF NEW JERSEY.

SYSTEM OF ELECTRICAL REGULATION.

Application filed June 29, 1914. Serial No. 284,860.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Regulation, of which the following is a full, clear, concise, and exact description, reference being had to the accompanying drawing, forming a part of this specification.

This invention relates to systems of electrical regulation.

The invention is especially applicable to the regulation of variable speed generators such as are used in railway-car and automobile lighting systems wherein the generator is employed to charge a storage battery and supply a lamp or other load. When the generator is at rest, or is operating at a low speed, the battery supplies the load.

In systems of the type above mentioned, it is often desirable to regulate the generator mainly in accordance with the battery charging current. This is especially the case where a large variable lamp load has to be supplied with current. The regulation in such a system is generally accomplished by an electro-magnetic winding in series in the battery lead, which controls a variable resistance in the field circuit of the generator. Should the lamp load to be supplied by the battery, when the generator is at rest or operating at a low speed, exceed in value the current which will operate the regulator, there will result an operation of the regulator by the battery discharging current which will insert a resistance in the field circuit acting to prevent the generator from building up to a proper voltage until a very high speed has been attained.

In such systems also it is often desirable to provide a connection from the battery whereby the battery may furnish the initial exciting current to insure a proper building up of the generator field.

An object of the present invention is to provide an improved system of regulation which will insure a proper building up of the generator voltage and will prevent interference therewith by the battery discharging current.

Another object of the invention is to provide a generator regulator having increased stability at all generator speeds.

Another object of the invention is to provide a regulator which will insure close regulation of the generator under normal and abnormal circuit conditions.

Another object of the invention is to provide an improved system of regulation for insuring a taper charge for the battery.

Another object of the invention is to provide an improved system of regulation which will insure a proper generator voltage to permit floating the battery across the system when the battery is fully charged.

Another object of the invention is to provide improved means for regulating the generator in accordance with the state of charge of the battery.

These and other objects are obtainable by the systems illustrated in the accompanying drawings, in which—

Figure 1 represents diagrammatically a system for providing constant charging current for the battery.

Figure 2 represents diagrammatically a modified arrangement for producing tapering charge for the battery.

Figure 3 represents diagrammatically a system wherein the battery will be caused to float across the line.

Figure 4 represents diagrammatically a modification of the system illustrated in Figure 3.

Figure 5:
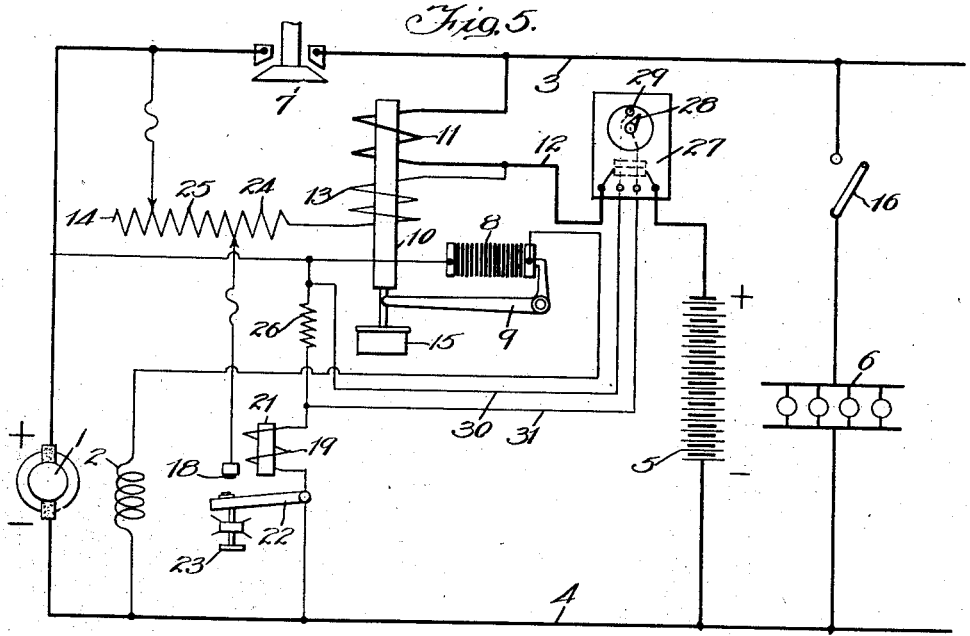
Figures 5 and 6 illustrate diagrammatically a modified system having improved means for regulating the generator in accordance with the state of charge of the battery.

In a co-pending application, Serial No. 832,503, filed April 17, 1914, there are described and claimed certain of the broad features described in the present application.

Figure 1 illustrates a variable speed generator having an armature 1 and a shunt field winding 2. Positive and negative generator leads 3 and 4 supply a storage battery 5 and lamps or other translating devices 6, connected in parallel branches across the leads. An automatic switch 7, of any preferred construction, is arranged in one of the generator leads. The automatic switch will connect the generator to the system when the generator voltage substantially equals the battery voltage, and will disconnect the generator when its voltage falls below that of the battery.

Regulation of the generator is accomplished by means of a variable resistance, herein illustrated as a compressible rheostat 8, in series with the generator field. The pressure on the rheostat is controlled by a bell crank lever 9, pivotally connected to a magnetic member or core 10, normally under the control of a coil 11, surrounding said core and connected in the battery lead 12. A second winding 13 is adapted under certain conditions, to assist or oppose the coil 12 in the control of the rheostat. The coil 13 has one terminal connected to the positive battery lead and the other terminal connected through an adjustable resistance 14 to the positive generator lead, between the automatic switch and the generator armature. A dash-pot 15 may be provided, if desired, to steady the action of the core 10.

With the generator at rest, the automatic switch will be open, as illustrated in the drawing, and the rheostat will be under maximum pressure, whereby the resistance of the field circuit is a minimum. A small amount of current will flow from the positive battery terminal, through the coil 13 and adjustable resistance 14, to the positive generator terminal where it will divide, a large portion returning through the generator armature to the negative battery terminal. Due to the resistance of the armature brushes and commutator, a slight current will also flow through the rheostat 8 and shunt field winding in parallel to the armature. This small current will sufficiently excite the field to insure building up of the generator voltage as the armature begins to rotate. As soon, however, as the generator builds up to the proper voltage, the automatic switch will close, and the coil 13 and resistance 14 will be short-circuited so that regulation of the generator is controlled by the coil 11 in series with the battery circuit. This coil operates in a well known manner to maintain constant charging current for the battery, but at the same time will permit the generator current to increase sufficiently when necessary to supply the lamp load.

When the generator voltage drops, due to the slowing down of the generator, or other causes, the automatic switch will again open. The battery now supplies the lamps by a circuit from the positive battery terminal, through the coil 11 in the reverse direction, lead 3, lamp switch 16, lamps 6, and negative lead 4, to the negative battery terminal. If the current demanded by the lamps is of considerable value there would be a tendency for the coil 11 to raise the core 10 and to increase the resistance of the rheostat. If the generator armature now started to rotate, the voltage would not be built up properly, due to an increased resistance in the field circuit. Thus it might be possible for the series winding 11, operating alone, to interfere with the building up of the generator. The short circuit around the coil 13, however, having been opened by the opening of the automatic switch, the coil 13 will be energized from the battery by the circuit above traced. This coil is wound to oppose the effect of the battery discharging current in coil 11. The windings 11 and 13 are so proportioned that the resultant effect on the core 10 will be insufficient to raise the core with any predetermined lamp load which the battery may be called upon to supply. Thus, assume for illustration that the windings are so proportioned that with current equal to normal battery charging current flowing in coil 11 and full battery voltage impressed on coil 13, the two windings have substantially an equal number of ampere turns. If, therefore, the lamp load were equal to the normal battery charging current, the magnetic effect upon the core 10 would be zero, or if the lamp load were very much greater at this time, there might be a prepondering effect, caused by the ampere turns of the winding 11. However, the regulator would not be actuated until approximately twice the number of effective ampere turns of the winding 11 are active upon the core 10, and this would mean that the lamp load would have to take three times as much current as the normal charging current, before the regulator would be operated. This cannot occur from normal operation because there are not sufficient lamps in the circuit to carry the current, and as a consequence, the regulator is restrained from action at all times except when the full charging current is flowing into the battery.

The illustration chosen is merely to aid in describing the operation of the regulator, and it is obvious that any desired ratio may be caused to exist between the shunt and series windings, depending upon the partcular conditions to be met. It is desirable, of course, to reduce the number of turns in the shunt winding 13 to the lowest number which will properly prevent operation of the regulator by battery discharging current, as the amount of energy expended in regulation is thereby reduced. The ratio between the windings 11 and 13 may be easily varied by variation of the adjustable resistance 14.

Figure 2 illustrates a modified arrangement in which one terminal of the coil 13, instead of being connected to the positive generator lead, is connected to the positive field lead between the rheostat 8 and the field winding. The remaining connections are the same as those described in Figure 1.

The small current which flows from the battery through coil 13, in this modification, divides at the point 17, a portion flowing through the field winding to the negative battery terminal and the remainder returning to the battery through the rheostat and generator armature which, at rest, develops no opposing E. M. F.

With the generator at rest, full battery voltage will be impressed across the exciting circuit above described. With the automatic switch closed, the winding 13 and the adjustable resistance 14 will be connected as a shunt across the rheostat, so that at low generator speeds, with the pressure on the rheostat at a maximum, the winding 13 will have a negligible regulating effect on the rheostat. The effect exerted by the winding 13 will be in a direction to assist the coil 11, which is now energized by current flowing in a direction to charge the battery. As the generator speed increases, the resistance of the rheostat is increased and the coil 13 will increasingly assist the current coil 11, with the result that the current supplied to the battery will taper off in value, depending on the relative magnetizing effect of the coils 11 and 13. Upon battery discharge, the polarity of coil 11 will reverse, while that of coil 13 remains constant, so that battery discharging current will be prevented from interfering with the proper building up of the generator, in the same manner as described in Figure 1.

Figures 3 and 4 illustrate systems similar respectively to Figures 1 and 2, with the addition of means whereby the voltage winding 13 may also act, under certain conditions, to regulate the generator voltage to float the battery across the line. In these modified systems, an additional connection is made between an adjustable intermediate point on the resistance 14 and the stationary contact 18 of a stop charge relay. This stop charge relay has an operating coil 19 connected across the generator through a resistance 20 of zero temperature resistance coefficient. The core 21 of the relay cooperates with a pivoted contact-carrying armature 22, to close electrical connection between the contact 18 and the negative generator lead. An adjusting screw 23 controls the air gap and consequently the point of operation of the relay. The remaining features of Figures 3 and 4 are the same respectively as the corresponding features in Figures 1 and 2.

The operation of the system illustrated in Figure 3 is the same as that in Figure 1 up to the point when the voltage has risen to the maximum voltage desired to have impressed across the battery. This point may vary with different systems, but in a standard system employing 16 lead cells may be assumed as 42 volts. Upon this predetermined voltage being reached, the stop charge relay will operate and a new circuit will be established, including the winding 13 and the right hand portion 24 of the adjustable resistance 14. The adjustment is such that under this condition the coil 13 will be sufficiently energized to reduce the generator voltage to that which will cause the battery to float across the line. With the battery assumed for illustration, this will be approximately 35 volts. This will reduce the battery charging current, and consequently the current in coil 11, to zero, so that thereafter the winding 13 will operate to maintain constant potential on the system, regardless of speed changes. The current from the generator may, of course, increase to supply increased lamp demands.

Closure of the stop charge relay also connects the left hand portion 25 of the resistance 14 in parallel with the voltage winding of the regulator. This gives a desirable electrical damping action, inasmuch as the parallel connection of this non-inductive resistance across the controlling winding of the regulator prevents rapid variation of magnetic flux through the core of the regulator and thereby aids in stability of regulation.

The system illustrated in Figure 4 operates as described in connection with Figure 2, to provide a taper charge for the battery. Upon full battery voltage being reached, the stop charge relay operates as described in connection with Figure 3.

With this modification, closure of the stop charge relay connects the left hand portion 25 of the resistance 14 as a non-inductive shunt across the field winding of the generator. The local circuit, including the field winding and the resistance 25, will aid in preventing rapid flux changes in the generator and will therefore result in increased stability of operation.

Figure 6:
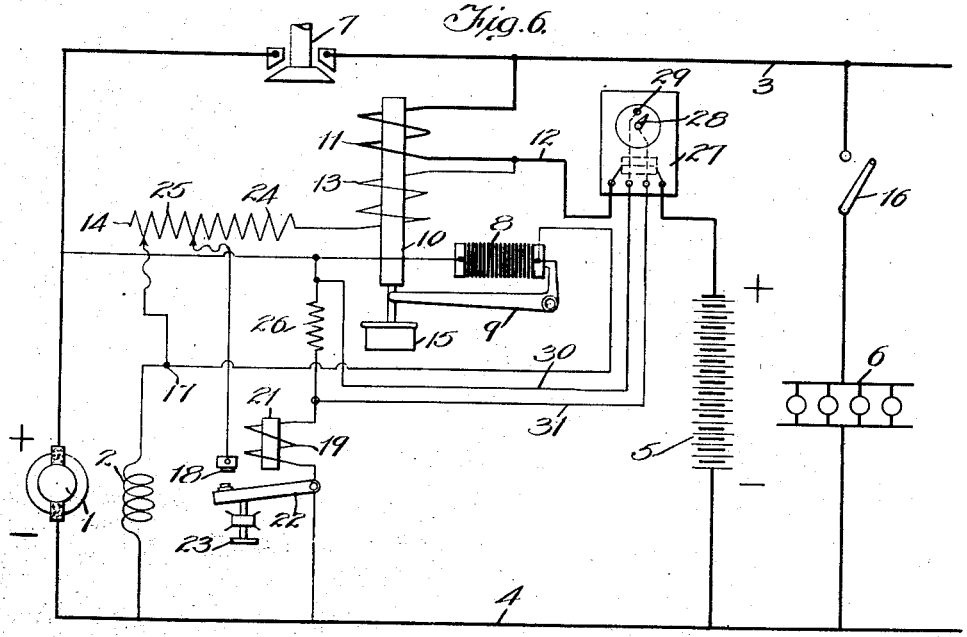

Figures 5 and 6 illustrate still further modifications in which the voltage winding of the regulator is normally directly controlled by the state of charge of the battery. The connections in Figures 5 and 6 are the same respectively as those illustrated in Figures 3 and 4. In the modified systems in Figures 5 and 6, however, a resistance 26 in series with the stop charge relay coil 19, is adapted to be short-circuited under predetermined conditions by contacts operated by an ampere hour meter 27. The meter 27 is directly connected in the battery circuit and may be of any desired type. It preferably consists of a compensating meter which will register the ampere hours delivered to the battery and will automatically change its rate on battery discharge to compensate for the internal losses in the battery, so as at all times to accurately indicate the state of charge of the battery. The indicating pointer 28 of the meter is adapted to make contact with the contact 29 when a full charge has been delivered to the battery. The pointer 28 and contact 29 control a short circuit 30, 31 around the resistance 26, which is closed when the battery is fully charged and open when less than a full charge is in the battery. The value of resistance 26 is such that when it is short-circuited, the stop charge relay will be caused to operate to cause reduction of the generator voltage sufficient to float the battery, as explained in connection with Figures 3 and 4. Thus, whenever the meter indicates full charge in the battery, the battery is caused to float and the system is thereafter regulated for constant potential, regardless of speed changes of the generator.

When the generator armature slows down, the automatic switch will open and if lamps are burning the battery will discharge, thereby operating the ampere hour meter in a reverse direction to open the short-circuit 30, 31, and include the resistance 26 in circuit, so that upon increase in generator speed, the system will operate as a constant current or taper charge regulator, according to the connections employed, until the battery is again fully charged.

The resistance 26 is given such a value that the stop charge relay will not operate with the resistance in circuit until the voltage of the system has risen to an abnormal value, for example 50 volts, under the conditions heretofore assumed. Should abnormal conditions arise therefor, such for example as accidental open-circuiting of the battery, causing an abnormal rise in generator voltage, the relay will operate to reduce the generator voltage to the predetermined floating battery voltage, which will be maintained, regardless of speed variations. In this system, therefore, the stop charge relay, which acts to convert the generator into a voltage regulator, will normally be under control of the ampere hour meter, but under abnormal conditions, will act to reduce the generator voltage to a safe value.

Various modified systems have been illustrated and described herein for the purpose of clearly pointing out the principles of the invention, but it is obvious that many other modifications may be made which will embody the principles of the invention as defined in the appended claims.

What I claim as new and desire to secure by Letters Patent of the United States, is—

1. In a system containing a variable speed generator having a field winding, a storage battery to be charged by said generator, a load circuit to be supplied by said generator or battery, a variable resistance for regulating the strength of said field winding, and an electro-magnetic device for varying said resistance, said device having a current coil responsive to current flowing to or from said battery and a winding adapted under predetermined conditions to oppose the effect of said current coil, said winding having connections whereby current therethrough may also serve to energize said field winding.

2. In a system containing a variable speed generator having a field winding, regulating means for said field winding, an electro-magnetic device for controlling said regulating means, said device having a current responsive coil and a voltage responsive coil and connections whereby current through said voltage responsive coil may also serve to energize said field winding.

3. In a system containing a variable speed generator having a field winding, regulating means for said field winding, means for controlling said regulating means, and an electro-magnetic winding acting under predetermined conditions to oppose said controlling means, said winding having connections whereby current therethrough may also energize said field winding.

4. In combination, a variable speed generator, a storage battery to be supplied thereby, electro-magnetic means for regulating said generator in accordance with battery charging current, and means for rendering said electro-magnetic means inoperative under predetermined conditions, said last mentioned means also having connections to insure an initial building up of the generator voltage upon rotation of the generator armature.

5. In a regulating system for a variable speed generator, means for regulating the field of the generator, means for operating said regulating means, said operating means having a current responsive winding and a voltage responsive winding, connections whereby said windings may oppose one another, and automotic means for varying the effectiveness of said voltage responsive winding.

6. In a regulating system for a variable speed generator, means for regulating the field of the generator, means for operating said regulating means, said operating means having a current responsive winding and a voltage responsive winding, and means for varying the effectiveness of said voltage responsive winding, said voltage responsive winding having connections whereby current therethrough may energize the field of said generator.

7. In combination, a variable speed generator, a storage battery to be charged thereby, a regulator for said generator, said regulator having a current responsive operating coil and a voltage responsive modifying coil, said voltage responsive modifying coil having one terminal connected to one terminal of said battery and the other terminal in electrical connection with a like terminal of the field winding of said generator.

8. In combination, a variable speed shunt-wound generator, a storage battery connected thereto, a variable resistance for regulating the field of said generator, and an electromagnetic device for varying said resistance, said device having a coil connected in series with said battery and a coil having one terminal connected to one terminal of the battery and the other terminal in electrical connection with a like terminal of the generator field winding.

9. In combination, a variable speed shunt-wound generator, a storage battery connected thereto, a variable resistance for regulating the field of said generator, an electromagnetic device for varying said resistance, said device having a coil connected in series with said battery and a coil having one terminal connected to one terminal of the battery and the other terminal in electrical connection with a like terminal of the generator field winding, and means for automatically varying the effectiveness of said last mentioned coil.

10. In an electrical system of distribution, a variable speed shunt-wound generator, a storage battery connected thereto, a regulating device for the field of said generator, said device having a coil in series with said battery and a coil having its respective terminals in electrical connection with the positive terminal of said battery and the positive terminal of the shunt field winding of the generator, and means for connecting one terminal of said last mentioned coil to the negative terminal of the battery.

11. In an electrical system of distribution, a variable speed shunt-wound generator, a storage battery connected thereto, a regulating device for the field of said generator, said device having a coil in series with said battery and a coil having its respective terminals in electrical connection with the positive terminal of said battery and the positive terminal of the shunt field winding of the generator, and means responsive to the voltage of the system for connecting one terminal of said last mentioned coil to the negative terminal of the battery.

12. In an electrical system of distribution, a variable speed shunt-wound generator, a storage battery adapted to be connected thereto, a variable resistance in series with the generator field winding, an electro-magnetic device for varying said resistance, said device having a coil connected in series with said battery and a coil having one terminal connected to one terminal of the battery and the other terminal in electrical connection through a resistance with a terminal of said field winding of like polarity to said battery terminal, and means for connecting an intermediate point on said resistance to the opposite terminal of said battery under predetermined conditions.

13. In an electrical system of distribution, a variable speed generator provided with a shunt field coil, regulating means for the field of said generator, a current responsive coil for controlling said regulating means, a voltage responsive coil for modifying the action of said current coil, a resistance in series with said voltage coil, and means for connecting a portion of said resistance in shunt around one of said coils to increase the stability of operation of said system.

14. In an electrical system of distribution, a variable speed generator provided with a shunt field coil, regulating means for the field of said generator, a current responsive coil for controlling said regulating means, a voltage responsive coil for modifying the action of said current coil, a resistance in series with said voltage coil, and voltage controlled means for connecting a portion of said resistance in shunt around one of said coils to increase the stability of operation of said system.

15. In an electrical system of distribution, a variable speed generator provided with a shunt field coil, regulating means for the field of said generator, a current responsive coil for controlling said regulating means, a voltage responsive coil for modifying the action of said current coil, a resistance in series with said voltage coil, voltage controlled means for connecting a portion of said resistance in shunt around one of said coils to increase the stability of operation of said system, and means for controlling the operation of said last mentioned means.

16. In an electrical system of distribution, a variable speed generator provided with a shunt field coil, a storage battery to be charged thereby, regulating means for the field winding of said generator, a current responsive coil for controlling said regulating means, a voltage responsive modifying coil for modifying the action of said current coil, a resistance in series with said voltage responsive coil, means for connecting a portion of said resistance in shunt around one of said coils to increase the stability of operation of said system, and means responsive to the condition of charge of said battery for controlling the operation of said last mentioned means.

17. In an electrical system of distribution, a variable speed generator provided with a shunt field coil, a storage battery to be charged thereby, regulating means for the field winding of said generator, a current responsive coil for controlling said regulating means, a voltage responsive modifying coil for modifying the action of said current coil, a resistance in series with said voltage responsive coil, and a third coil for connecting a portion of said resistance in shunt around one of said coils to increase the stability of operation of said system.

18. In an electrical system of distribution, a variable speed generator provided with a shunt field coil, a storage battery to be charged thereby, regulating means for the field winding of said generator, a current responsive coil for controlling said regulating means, a voltage responsive modifying coil for modifying the action of said current coil, a resistance in series with said voltage responsive coil, a third coil for connecting a portion of said resistance in shunt around one of said coils to increase the stability of operation of said system, and means directly responsive to the state of charge of the battery for controlling the operation of said third coil.

19. In combination, a variable speed generator having a shunt field winding, a storage battery to be charged thereby, a variable resistance in series with the field winding of said generator, electro-magnetic means for controlling the variable resistance, said means having a coil in series with said battery, a coil having one terminal connected to the positive terminal of said battery and one terminal in electrical connection with the positive terminal of the field winding through a variable resistance, a stop charge relay adapted to connect an intermediate point in said resistance to the negative terminal of the battery, and an ampere hour meter for measuring the charge and discharge of said battery for controlling the operation of said stop charge relay.

20. In combination, a variable speed generator having a shunt field winding, a storage battery to be charged thereby, a variable resistance in series with the field winding of said generator, electro-magnetic means for controlling the variable resistance, said means having a coil in series with said battery, a coil having one terminal connected to the positive terminal of said battery and one terminal in electrical connection with the positive terminal of the field winding through a variable resistance, a stop charge relay adapted to connect an intermediate point in said resistance to the negative terminal of the battery, an operating coil for said relay connected across said battery through a resistance, and an ampere hour meter in series with the battery for short-circuiting said resistance upon the delivery of a predetermined charge to said battery.

21. In an electrical system of distribution wherein a variable speed dynamo charges a storage battery and a current regulator varies the resistance of the field circuit of the dynamo to tend to prevent speed changes from altering the current output of the dynamo, the combination with said current regulator of means for modifying its action to reduce the dynamo current as the speed of the dynamo increases.

22. In an electrical system of distribution, a shunt wound variable speed dynamo, a storage battery charged thereby, a current regulator adapted to vary the resistance of the field circuit to prevent substantial change of current with change of speed, and a modifying coil responsive to speed change effects and acting on said regulator to reduce the current with increase of speed of the dynamo.

23. In an electrical system of distribution, a variable speed shunt wound dynamo, a storage battery charged thereby, a dynamo regulator having means responsive to electrical fluctuations produced by speed changes to vary the field circuit resistance, to tend to produce substantial constancy of dynamo output and also responsive to the variations of field circuit current to reduce the dynamo output as the speed increases.

24. In an electrical system of distribution, the combination of a generator driven at variable speed, a storage battery charged thereby and means for causing the generator current to be decreased with an increase in speed thereof, said means including a coil serially connected between the generator and battery and a coil affected by changes in generator speed.

25. In an electrical system of distribution, a generator driven at variable speed, a storage battery and work circuit fed thereby, means regulating the generator output acting to decrease the generator current as its speed increases, said means including a coil serially connected between the generator and battery and a coil affected by changes in generator speed for regulating the generator current during the charging of the battery.

26. In an electrical system of distribution, a generator driven at variable speed, a storage battery and work circuit fed thereby, means regulating the generator output acting to decrease the generator current as its speed increases, said means including a coil serially connected between the generator and battery and a coil affected by changes in generator speed for regulating the generator current during the charging of the battery, and means whereby the generator voltage is limited upon the battery becoming charged to decrease the battery charging current.

27. In an electrical system of distribution the combination of a generator driven at variable speed, a storage battery charged thereby and means for causing the generator current to be decreased with an increase in speed thereof, said means including a variable resistance regulating the generator field, a coil serially connected between the generator and battery affecting said resistance and tending normally to maintain the current in the coil substantially constant and a coil co-operating therewith and affected by speed changes and acting to cut down said current with an increase in speed of the generator.

28. In an electrical system of distribution, including a generator driven at variable speed and a storage battery charged thereby, regulating apparatus for said generator including means tending to maintain the generator output unaffected by speed changes thereof and means co-operating therewith to give a definite decrease of generator output with increased speed of the generator.

29. In apparatus of the class described, in combination, a generator, regulating means for said generator comprising a voltage coil, a resistance element connected with said coil, manually controlled means adapted to vary the resistance of said element, a storage battery adapted to be charged by said generator, and an ampere hour meter through which current is led to said battery adapted automatically when the battery has reached a predetermined state of charge to vary said resistance.

30. In apparatus of the class described, in combination, a generator, a storage battery adapted to be charged thereby, regulating apparatus for said generator comprising a voltage coil, manually controlled means adapted to vary the strength of said voltage coil, and means adapted automatically to change the strength of said coil upon said battery being charged by said generator to a predetermined extent.

In witness whereof, I have hereunto subscribed my name.

WILLIAM A. TURBAYNE.